United States Patent [19]

Bunton

[11] Patent Number: 4,916,358

[45] Date of Patent: Apr. 10, 1990

[54] KINESCOPE GROUNDING SYSTEM

[75] Inventor: Terry W. Bunton, Martinsville, Ind.

[73] Assignee: RCA Licensing Corporation, Princeton, N.J.

[21] Appl. No.: 262,396

[22] Filed: Oct. 25, 1988

[51] Int. Cl.⁴ ...................... H01J 29/87; H01F 13/00; H04N 5/65

[52] U.S. Cl. .................................... 313/479; 313/313; 361/150; 358/246; 439/95; 439/96

[58] Field of Search ................ 313/479, 313; 358/246; 439/92, 95, 96, 931; 361/150

[56] References Cited

U.S. PATENT DOCUMENTS

| | | | |
|---|---|---|---|
| 3,746,904 | 7/1973 | Torre | 313/64 |
| 3,937,995 | 2/1976 | DeVito | 313/49 |
| 4,564,786 | 1/1986 | Baum et al. | 313/479 |
| 4,812,946 | 3/1989 | Prigent et al. | 361/150 |

*Primary Examiner*—Sandra O'Shea
*Attorney, Agent, or Firm*—Joseph S. Tripoli; Dennis H. Irlbeck

[57] ABSTRACT

The present invention provides an improved grounding system for a kinescope having a conductive outer coating. The system includes a conductive metal tape having an adhesive on one surface thereof and exposed metal on the other surface thereof. The metal tape is adhered to the kinescope by its adhesive side. The metal tape extends from the conductive outer coating to means on the kinescope connecting to an electrical ground, and it is in electrical contact with the coating and interconnecting to the electrical ground through the means.

6 Claims, 4 Drawing Sheets

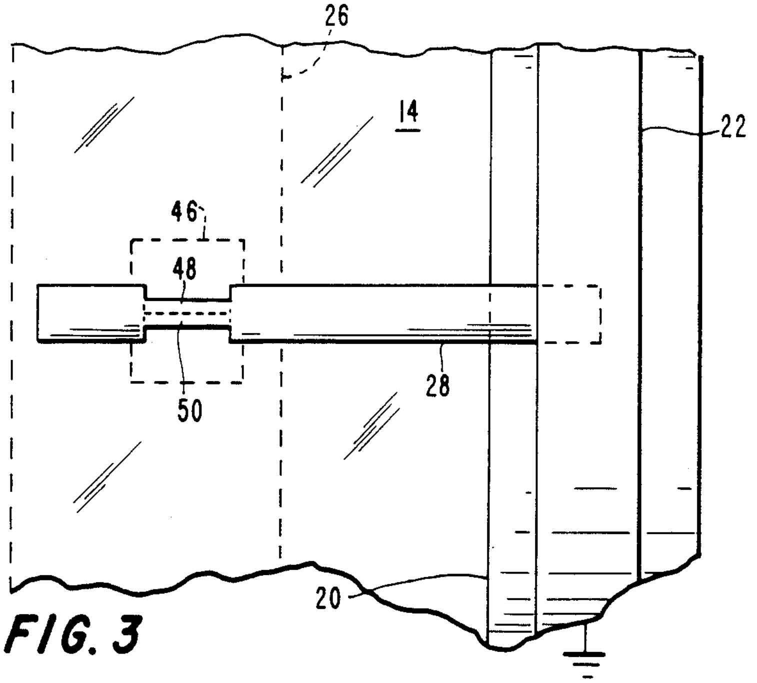
FIG. 3
FIG. 4
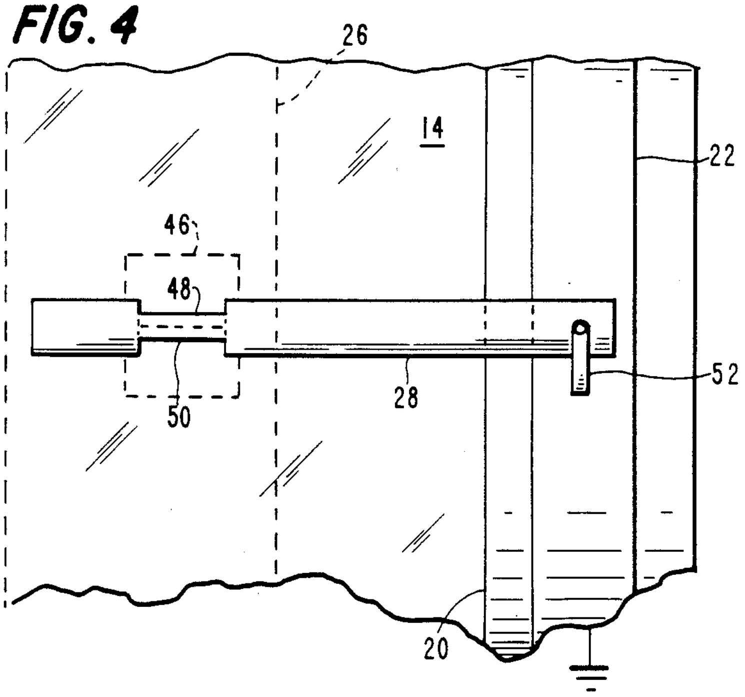

KINESCOPE GROUNDING SYSTEM

The present invention relates to kinescope grounding systems and, particularly, to a kinescope grounding system that provides for an efficient means of installation in an automated final instrument assembly environment.

Kinescopes or cathode-ray tubes require some means for providing high-voltage grounding to a receiver chassis or other lectrical ground. High-voltage grounding straps are widely used to provide the grounding function. Such straps include suitable mechanical connections at the kinescope and at the ground terminal. The straps also must have the capacity for the required operating voltages and currents and must be able to withstand various mechanical and electrical stresses. Such straps tend to be costly and labor-intensive to install. Therefore, there is a need for an improved kinescope grounding system that will meet all of the mechanical and electrical requirements now met by use of straps, but that will be less costly and permit a more efficient installation.

SUMMARY OF THE INVENTION

The present invention provides an improved grounding system for a kinescope having a conductive outer coating. The system includes a conductive metal tape having an adhesive on one surface thereof and exposed metal on the other surface thereof. The metal tape is adhered to the kinescope by its adhesive side. The metal tape extends from the conductive outer coating to means on the kinescope connecting to an electrical ground, and it is in electrical contact with the coating and interconnecting to the electrical ground through the connecting means.

DESCRIPTION OF THE DRAWINGS

FIG. 3 is a plan view of the grounding system of FIG. 1.

FIG. 4 is a plan view of an alternative grounding system.

DETAILED DESCRIPTION OF THE PREFERRED EMBODIMENTS

Figure 1:
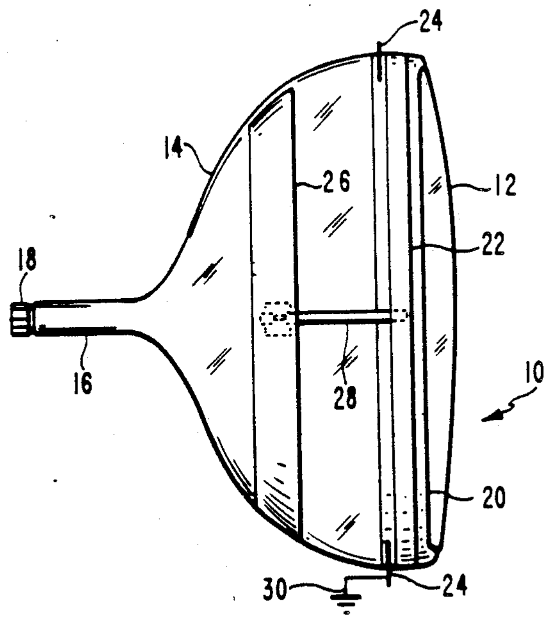
FIG. 1 is a side view of a kinescope including an improved grounding system.

FIG. 1 shows a kinescope 10 comprising a faceplate panel 12, a funnel 14 and a neck 16. A base 18, holding electrical leads from the kinescope, is attached to the end of the neck 16. A rimband 20 extends around the periphery of the faceplate panel 12. The rimband 20 is encircled by a tension band 22 that also overlaps four lugs 24 located at the corners of the panel 12. A conductive coating 26 is positioned on the outside surface of the funnel. A self-adhesive conductive metal tape 28 extends along the side of the kinescope, from the coating 26 to a location between the rimband 20 and the tension band 22. One of the lugs 24 is interconnected to a ground 30.

Figure 2:
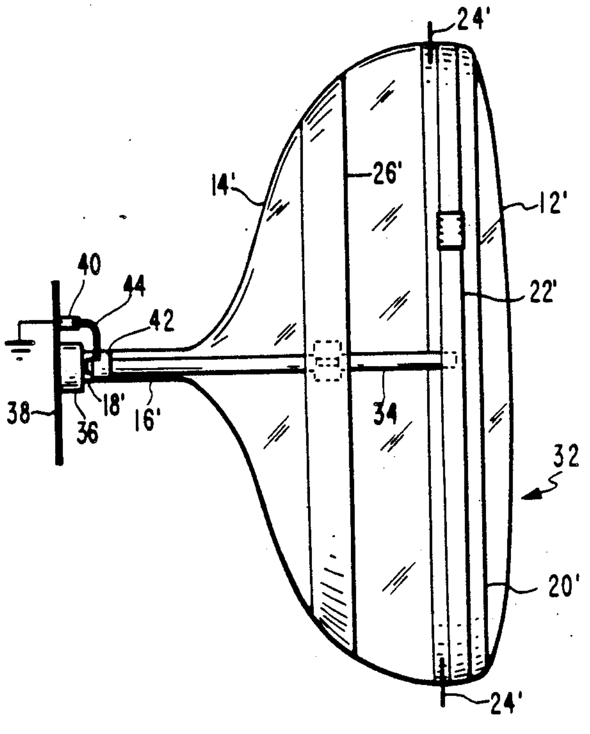
FIG. 2 is a bottom view of a kinescope including another improved grounding system.

FIG. 2 shows another kinescope 32, of the same type as the kinescope 10, having a modified high-voltage grounding system. Parts of the kinescope 32 that are similar to parts in the kinescope 10 are labelled with primes of the same numerals. On the kinescope 32, a self-adhesive conductive metal tape 34 extends along the bottom of the kinescope, from the neck 16' to the coating 26' and then to a location between the rimband 20' and the tension band 22'. The base 18' of the kinescope 32 is inserted into a socket 36 that includes a circuit board 38 with a ground terminal 40. The end of the metal tape 34 at the neck 16' is held by a conductive clamp 42 that surrounds the neck 26'. A wire 44 interconnects the clamp 42 to the ground terminal 40.

FIG. 3 shows the metal tape 28 portion of the high-voltage grounding system of FIG. 1 in enlarged detail. The tape 28 is a conductive metal, such as copper, coated on one side with a tacky adhesive. The non-coated side of the tape 28 has exposed metal and is conductive. Prior to application of the tape 28, the kinescope funnel 14 is coated with a small patch 46 of conductive coating, such as aquadag. Next, the tape 28 is cut twice on opposite edges, to form two portions 48 and 50. The portions 48 and 50 of the tape are folded over so that the conductive surfaces of these portions face in the same direction as does the adhesive side of the remaining portion of the tape. The tape 28 is then positioned on the funnel 14, as shown, with the folded-over portions of the tape contacting the conductive patch 46 and the opposite end of the tape 28 overlapping the rimband 20. Thereafter, the conductive coating 26, which also may be aquadag, is coated onto the funnel 14, overlapping the patch 46 and end of the tape with the folded over portions 48 and 50, and the tension band 22 is applied over the rimband 22 and other end of the tape 28.

An alternative embodiment is shown in FIG. 4, wherein the tape 28 is affixed to the kinescope on top of the tension band 22. However, in this embodiment, it is necessary to use a tab 52 to make the connection between the metal surface of the tape 28 and the band 22.

Figure 5:
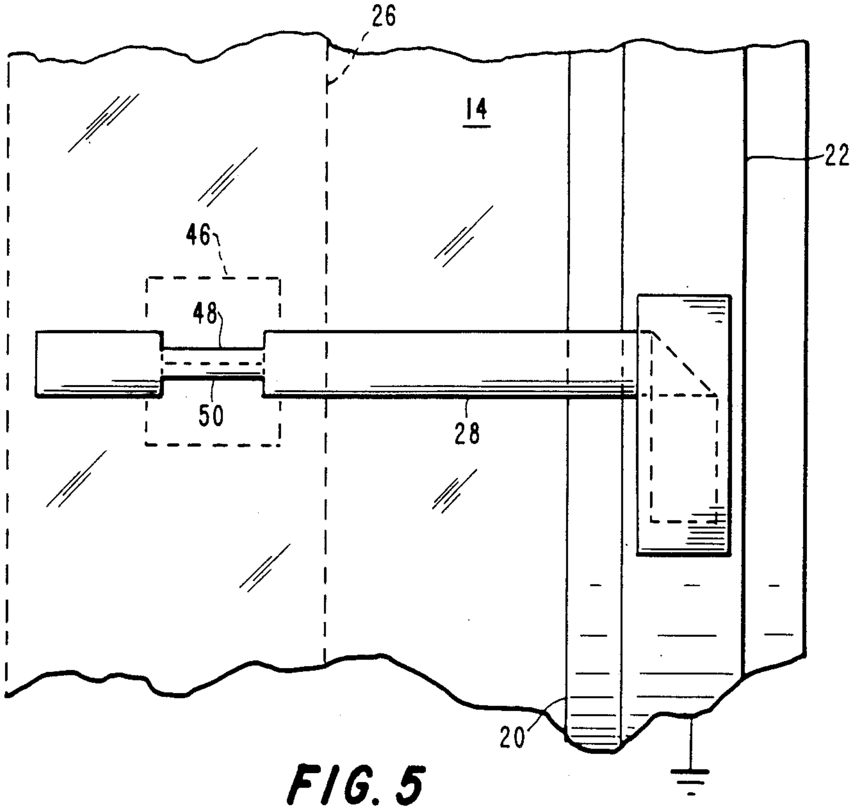
FIG. 5 is a plan view of another alternative grounding system.

Another alternative embodiment is shown in FIG. 5, wherein the tape 28 is folded over on top of the tension band 22 to place its metal surface in contact with the band 22. An adhesive tape 54 is affixed on top of the folded-over end of the tape 28, to secure it to the tension band 22.

Figure 6:
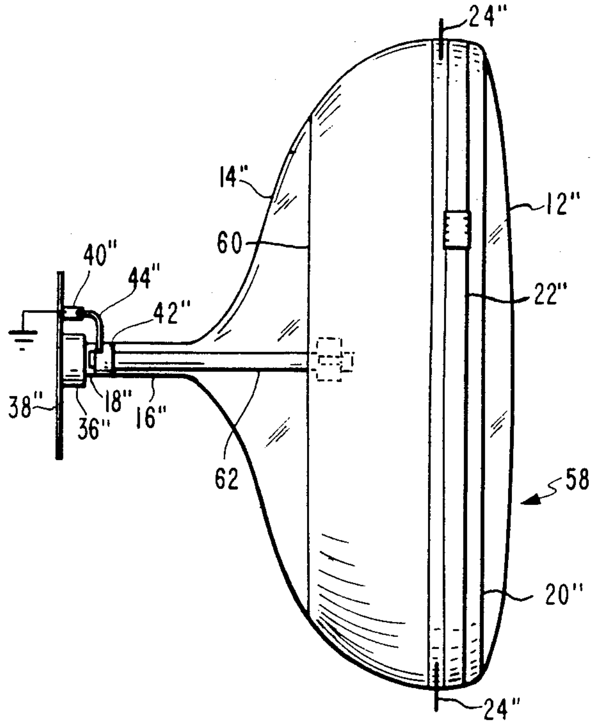
FIG. 6 is a bottom view of a kinescope including yet another alternative grounding system.

Yet another embodiment is shown in FIG. 6. Parts of this embodiment that are similar to the embodiment of FIG. 2 are labelled with double primes of the same numerals. A kinescope 58, of FIG. 6, includes an outer conductive coating 60 that extends from the middle of the funnel 14'' to the rimband 20''. A self-adhesive conductive metal tape 62 extends from the coating 60 to the end of the neck 16''. Connection to ground is made in the same manner as was described with respect to the embodiment of FIG. 2.

What is claimed is:

1. In a kinescope having a conductive outer coating and a peripheral tension band, said band being connected to an electrical ground, the improvement comprising a conductive metal tape having an adhesive on one surface thereof and exposed metal on the other surface thereof, said tape being adhered to said kindescope by it adhesive side, said tape extending from said conductive outer coating to said tension band, and said tape being in electrical contact with both said coating and band, said kinescope including a patch of additional conductive coating, said metal tape including a folded portion placing the exposed metal surface of said tape in contact with said patch, and said conductive outer coating overlapping said patch and said folded portion of said tape.

2. In a kinescope having a faceplate panel, a funnel and a neck, wherein a tension band surrounds said faceplate panel, a coating of conductive material is located on the outside surface of said funnel, and electrical connection means including a grounding means are interconnected to said kinescope through said neck, the improvement comprising a conductive metal tape having an adhesive on one surface thereof and exposed metal on the other surface thereof, said tape having its adhesive surface in contact with at least said funnel and extending at least from said tension band to said conductive coating, and said tape having a folded-over portion whereat exposed metal faces said funnel, a patch of additional conductive material on said funnel, located beneath said folded-over portion of said tape, and said coating overlapping said folded-over portion of said tape.

3. The kinescope as defined in claim 2, wherein said tape extends from said tension band to the neck of said kinescope.

4. The kinescope as defined in claim 3, wherein a ground lead is interconnected to said tape at the neck of said kinescope.

5. The kinescope as defined in claim 2, wherein a ground lead is interconnected to said tape at the tension band end of said tape.

6. In a kinescope having a faceplate panel, a funnel and a neck, wherein a coating of conductive material is located on the outside surface of said funnel, and electrical connection means including a grounding means are interconnected to said kinescope through said neck, the improvement comprising a conductive metal tape having an adhesive on one surface thereof and exposed metal on the other surface thereof, said tape having its adhesive surface in contact with at least said funnel and extending at least from said neck to said conductive coating, and said tape having a folded-over portion whereat exposed metal faces said funnel, a patch of additional conductive material on said funnel, located beneath said folded-over portion of said tape, and said coating overlapping said folded-over portion of said tape.

* * * * *